United States Patent [19]

Boyer

[11] Patent Number: 5,321,225
[45] Date of Patent: Jun. 14, 1994

[54] INSTALLATION FOR CONTROLLING TOOLING INCLUDING A CLAMP FOR PERFORMING A DETERMINED OPERATION ON WORKPIECES, RELATIVE DISPLACEMENT OF THE CLAMP AND SAID WORKPIECES BEING CONTROLLED BY AN AUTOMATIC POSITIONING SYSTEM

[75] Inventor: Jean-Noël Boyer, Mettray, France

[73] Assignee: Aro, France

[21] Appl. No.: 865,221

[22] Filed: Apr. 8, 1992

[30] Foreign Application Priority Data

Apr. 8, 1991 [FR] France .................... 91 04250

[51] Int. Cl.⁵ .......................... B23K 11/24; B25J 9/00
[52] U.S. Cl. ....................... 219/89; 219/110; 395/82; 901/41; 901/42
[58] Field of Search ............ 219/109, 110, 89, 86.24, 219/86.25, 86.41; 395/80, 82, 84, 89, 90, 95, 1; 901/2, 41, 42

[56] References Cited

U.S. PATENT DOCUMENTS

| | | | |
|---|---|---|---|
| 3,744,032 | 7/1973 | Engelberger et al. | 395/82 |
| 4,099,045 | 7/1978 | Okuda et al. | 219/109 |
| 4,296,304 | 10/1981 | Defourny | 219/86.41 |
| 4,317,980 | 3/1982 | Goodrich et al. | 219/110 |
| 4,578,562 | 3/1986 | Lindström et al. | 395/82 |
| 4,721,840 | 1/1988 | Fielding | 219/109 |
| 4,734,555 | 3/1988 | Ferguson | 219/109 |
| 4,999,475 | 3/1991 | Yasuge | 219/86.41 |
| 5,079,491 | 1/1992 | Nose et al. | 395/1 |

FOREIGN PATENT DOCUMENTS 331551 9/1989 European Pat. Off. .............. 395/82

Primary Examiner—Geoffrey S. Evans
Attorney, Agent, or Firm—Larson and Taylor

[57] ABSTRACT

The welding operation performed by the clamp 12 is under the control of a welding cabinet 15 including a servo-control unit 16' and an electronic switch 17. The clamp is moved from one weld spot to another by a robot 13 under the control of a control unit 14 provided with a servo-control unit 16. The switch 17 is controlled in such a manner that the welding operation and the beginning of the clamp opening operation and the end of the clamp closing operation are under the control of the welding cabinet 15 (with the robot then remaining stationary), while displacement of the clamp synchronizing with wide opening and closing thereof are under the control of the control unit 14.

10 Claims, 7 Drawing Sheets

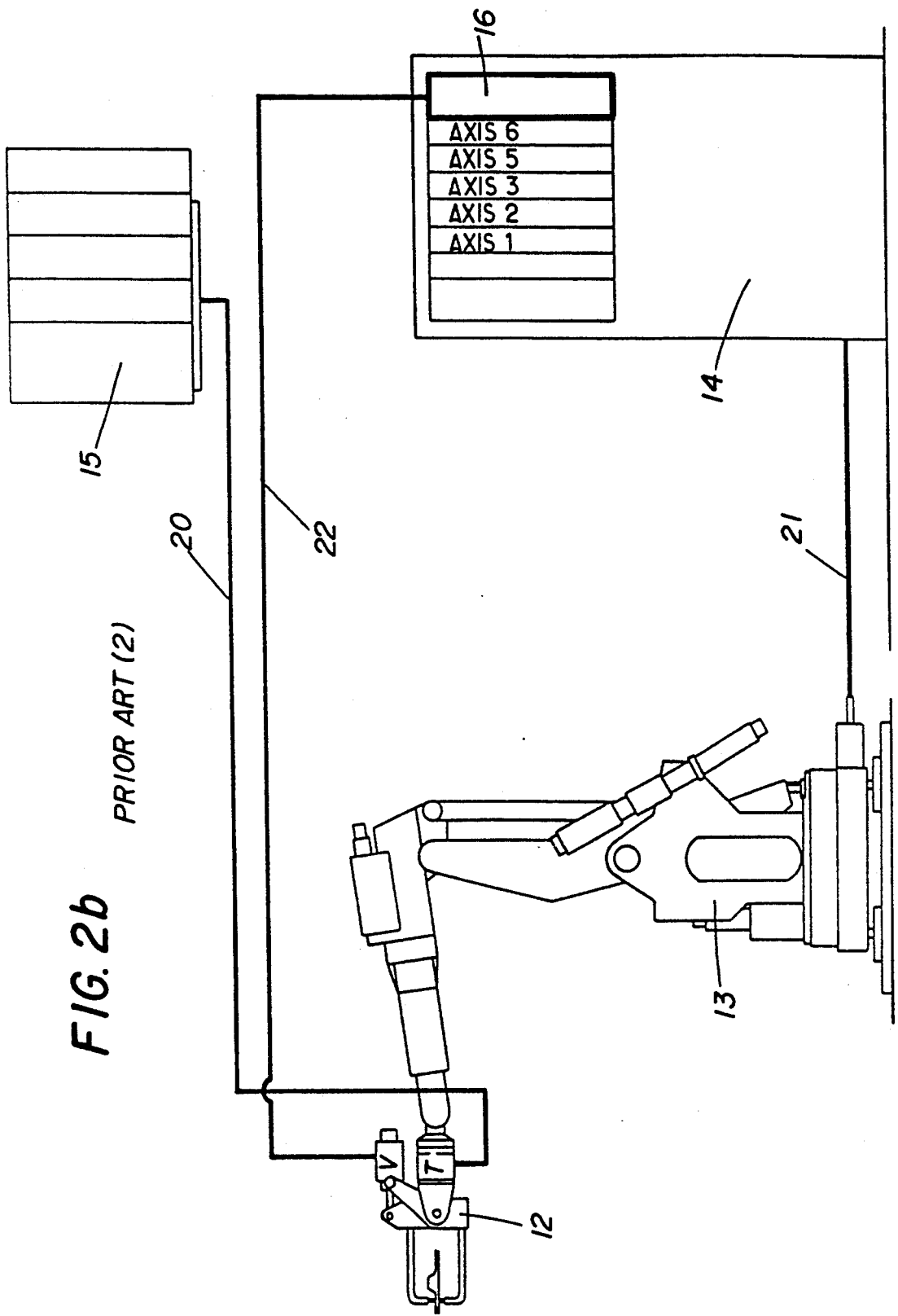
FIG. 2b  PRIOR ART (2)

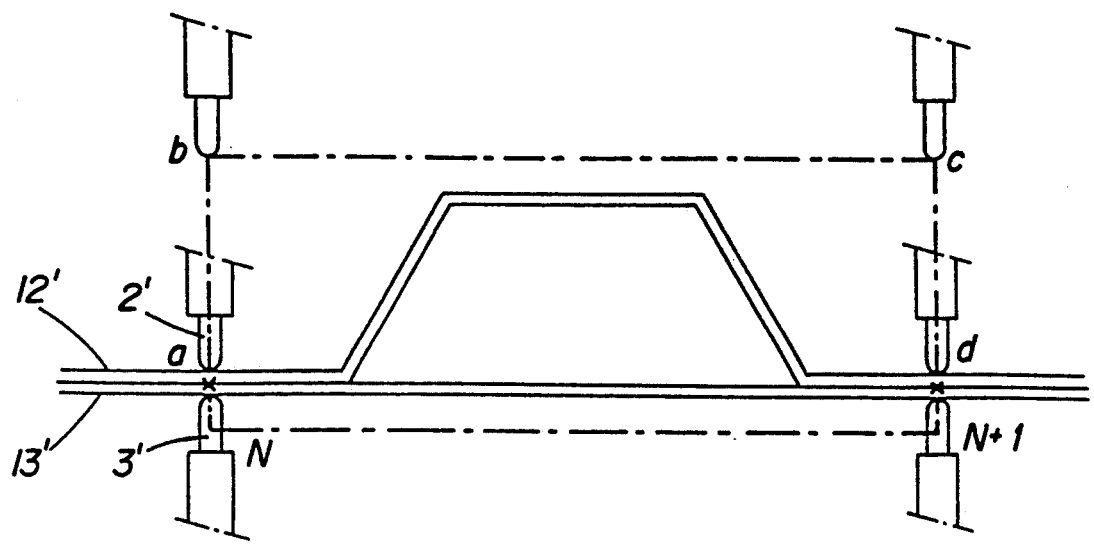
FIG. 3a    PRIOR ART (1)
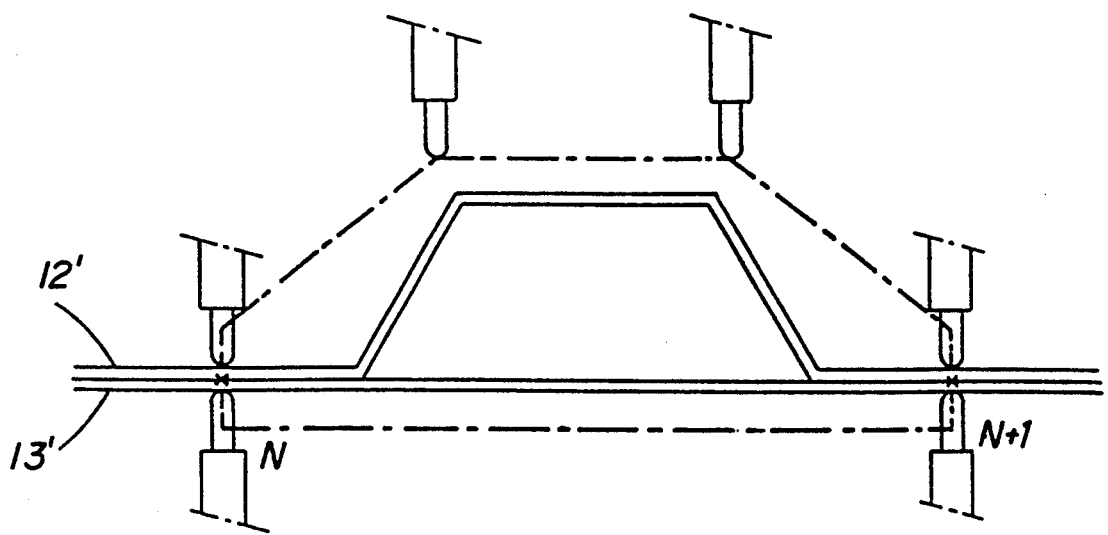
FIG. 3b    PRIOR ART (2)

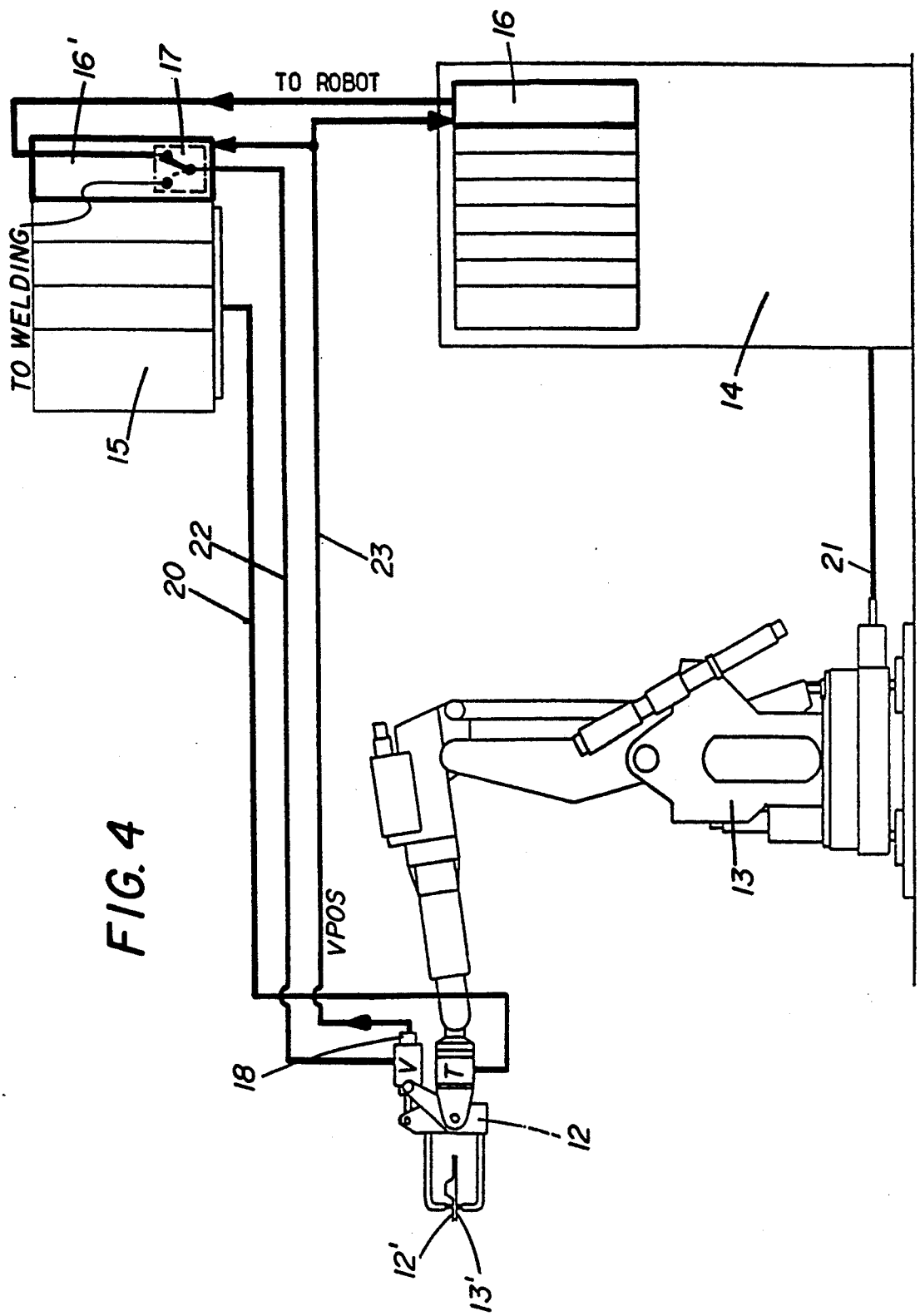

INSTALLATION FOR CONTROLLING TOOLING INCLUDING A CLAMP FOR PERFORMING A DETERMINED OPERATION ON WORKPIECES, RELATIVE DISPLACEMENT OF THE CLAMP AND SAID WORKPIECES BEING CONTROLLED BY AN AUTOMATIC POSITIONING SYSTEM

BACKGROUND OF THE INVENTION

The present invention relates to an installation for controlling tooling that includes a clamp for the purpose of performing a particular operation on workpieces, relative displacements between the clamp and said workpieces being controlled by an automatic positioning system, and more particularly to such an installation including a unit for controlling said operation, a servo-control unit suitable for controlling mainly the opening and closing of said clamp via drive means, a unit for controlling said positioning system, and a sensor suitable for providing information relating to progress of said operation.

The tooling having a clamp or other clamping members may be constituted, for example, by an electric spot welding clamp, by a tool for clamping or crimping or stapling, or by any other tool of the same type in which two co-operating members of the hinged or guided jaw type are required at a given moment to move towards the workpiece(s) to be treated or assembled, and then to move apart, and to be transferred to another work position. The automatic positioning system may be constituted by a robot or by a manipulator, under the control of a programmable controller or computer, with control being numerical or the like.

Mention is made above of relative displacement between the clamp and the workpieces. That covers the robot moving the workpieces, while the tooling including the clamp is stationary relative to the ground, and also the robot transporting the tooling, while the workpiece(s) is/are stationary relative to the ground.

The above-mentioned drive means that are servo-controlled in position may be constituted by a servo-controlled pneumatic actuator, by a servo-controlled hydraulic actuator, or by a servo-controlled electric motor associated with a mechanical system.

The electric motor technique has been described, in particular, in the following patent applications filed in the name of the Applicant:

French patent application No. 85 12239 filed Aug. 9, 1985;

European patent application No. 87 400305 filed Feb. 11, 1987; and

French patent application No. 89 12344 filed Sep. 20, 1989.

To describe the problem that the present invention seeks to solve, there follows a description of the two techniques presently known in the type of installation defined above, assuming that the problem is to control a resistance welding clamp fitted with a servo-controlled electrical actuator.

FIG. 1 shows a welding clamp fitted with an electrical actuator 1. The clamp is said to be an "X-clamp" since it includes a single hinge at 7. The clamp is constituted by an upper electrode-carrying arm 3 and a lower electrode-carrying arm 2. These two arms are hinged relative to each other about the above-mentioned hinge axis 7. One of the two arms may be connected to the fixed cradle 14 of the clamp by a backing-off and automatic centering system such as that described in French patent application No. 89 12344 filed Sep. 20, 1989. The electrical actuator 1 is connected firstly to the arm 3 via an actuator rod 11, and secondly to the arm 2 via an actuator stator 5 and a crank 2a. The electric actuator is constituted by an electric motor whose rotor 10 receives the nut of a nut and ballscrew system 6 for transforming the rotary motion of the motor into translation of the rod 11. The motor includes a position sensor 8 of the resolver type or of some other type (incremental, potentiometer, etc.), thereby enabling the control system to be informed about the angular position of the rotor and thus enabling the motor and ballscrew assembly to be servo-controlled in position and in velocity. Other sensors specific to the application (for measuring force, current, acceleration, etc.) may also be installed.

In the example described, the clamp is fixed on the wrist 9 of a robot suitable for displacing the clamp, with the workpieces 12' and 13' to be welded remaining stationary relative to the ground.

Together the motor and the hinge make it possible to close the clamp, i.e. to clamp sheet metal workpieces 12' and 13' between the electrodes 2' and 3', thereby bringing the workpieces towards each other. Once sufficient force is applied, current is passed through the assembled workpieces so as to form a melt spot between the workpieces 12' and 13', thereby obtaining a spot weld N. Once the welding cycle is completed, the motor is controlled to open the arms 2 and 3, with the servo-control system opening them far enough apart to enable them to reach the following spot N+1. Once the clamp has been opened, the robot can displace it to the following spot and start a new welding cycle.

FIGS. 2a and 2b show a clamp 12 mounted at the end of a robot 13 under the control of a control unit 14. The clamp is connected to a welding cabinet 15 (the unit that controls the operation) for controlling the welding cycle, i.e. for monitoring the flow of welding current through the workpieces to be welded.

Two configurations may be provided for the unit 16 that servo-controls the clamp motor:

Configuration No. 1: This configuration is shown in FIG. 2a where the servo-control unit 16 is included in the welding cabinet 15, thereby presenting numerous advantages:

a) accurate synchronization can be obtained between the position of the electrodes, the force between the electrodes, and the welding current. This gives rise to a reduction in cycle time (welding current can be applied as soon as the necessary force is achieved);

b) improved quality (while the current is flowing, the strength of the force is known reliably);

c) improved reliability (when the clamp closes, numerous tests relating to the distance between the electrodes can be performed: whether the thickness of the stack of sheet metal is correct; how far the electrodes have worn, etc.); and d) all of the parameters relating to welding are brought together in a single control unit, thereby providing a clear functional separation between the welding portions and the handling portions (robot).

Unfortunately, this configuration suffers from a drawback due to the fact that the opening of the clamp is not controlled by the robot: before the robot can be allowed to move to the following spot, the clamp must have opened sufficiently to ensure that any obstacles between the two spots can be cleared. This gives rise to the trajectory shown in FIG. 3a. Unfortunately, the time required to obtain such opening (portion a-b) is added to the cycle time, thereby penalizing the productivity of the installation. Similarly, closure can be initiated only once the robot has reached the next spot (spot c). The time required for closure (c-d) is then added to the displacement time of the robot.

Configuration No. 2: This configuration corresponds to FIG. 2b in which the servo-control unit 16 is integrated in the robot control cabinet 14. The cabinet 14 can then control the clamp as though it constituted an additional axis (e.g. a seventh axis if the robot already has six), and as a result it can synchronize clamp opening with the other displacements of the robot. This gives rise to the trajectory shown in FIG. 3b. This technique has an immediate advantage in that the time required for opening and closing the clamp on going from one spot to another can be masked completely or in part by the displacement time of the robot, thereby giving rise to significant productivity gain. In addition, this concept greatly facilitates on-site programming by robot training.

In contrast, this method includes as drawbacks the "advantages" listed for the preceding technique:

a) difficulty of obtaining synchronization between the position of the electrodes, the force between the electrodes, and the welding current, thereby lengthening cycle times;

b) this synchronization difficulty can give rise to reduced quality;

c) no specialized test functions relating to the welding operation: monitoring the thickness of the stack of sheet metal workpieces, monitoring the extent of electrode wear, etc.;

d) no clear separation between welding functions and handling functions (robot), thereby complicating adjustment, development, and maintenance; and e) it is sometimes necessary to perform special software development in the control cabinet for the robot or the manipulator, for example to make it possible to provide position and force servo-control for the tool.

SUMMARY OF THE INVENTION

An object of the present patent application is thus to make it possible to combine the two above-described ways of controlling the welding clamp or the like so as to combine their advantages while avoiding their drawbacks.

According to the present invention, this is done in an installation of the general type defined above by the installation being essentially characterized in that said servo-control unit is integrated in the unit for controlling the positioning system, in that said unit for controlling said operation includes an additional servo-control unit, and in that a switch is also provided under the control of said sensor:

firstly to ensure that during said operation the opening and the closing of said clamp are under the control of said additional servo-control unit of the said unit for controlling said operation; and secondly to ensure that during the displacement stage of said clamp the opening and the closing of said clamp are under the control of said servo-control unit of said unit for controlling said positioning system.

In other words, a combined control system is thus obtained for controlling tooling having a clamp or the like (e.g. a clamp with welding jaws), for controlling the opening and closing of the clamp, both by the operation control unit (welding or the like) while the operation is taking place, and by the positioning system control unit (robot control unit) while the clamp is being displaced.

Such a combined system makes it possible to optimize the complete cycle used for performing the operation in question (e.g. obtaining a spot weld), by synchronizing the movements of the clamp with the displacements caused by the positioning system, by minimizing the time required to interchange information between the positioning control system (i.e. the robot cabinet) and the control unit for said operation (i.e. the welding cabinet), and by controlling the parameters of the operation in question in a manner that is specific thereto, because of the specialization of said unit.

BRIEF DESCRIPTION OF THE DRAWINGS

A welding installation having an electrode clamp and in accordance with the present invention, and the operation thereof, are described below by way of non-limiting example and with reference to the other figures of the accompanying drawings, in which:

FIG. 2b shows a second known way in which the portions of the installation may be connected;

FIG. 3a shows the trajectory of the welding electrodes in the FIG 2a connection;

FIG. 3b shows one possible trajectory for said electrodes in the FIG 2b connection;

FIG. 4 is an overall diagram of the installation;

DESCRIPTION OF THE PREFERRED EMBODIMENTS

Figure 1:
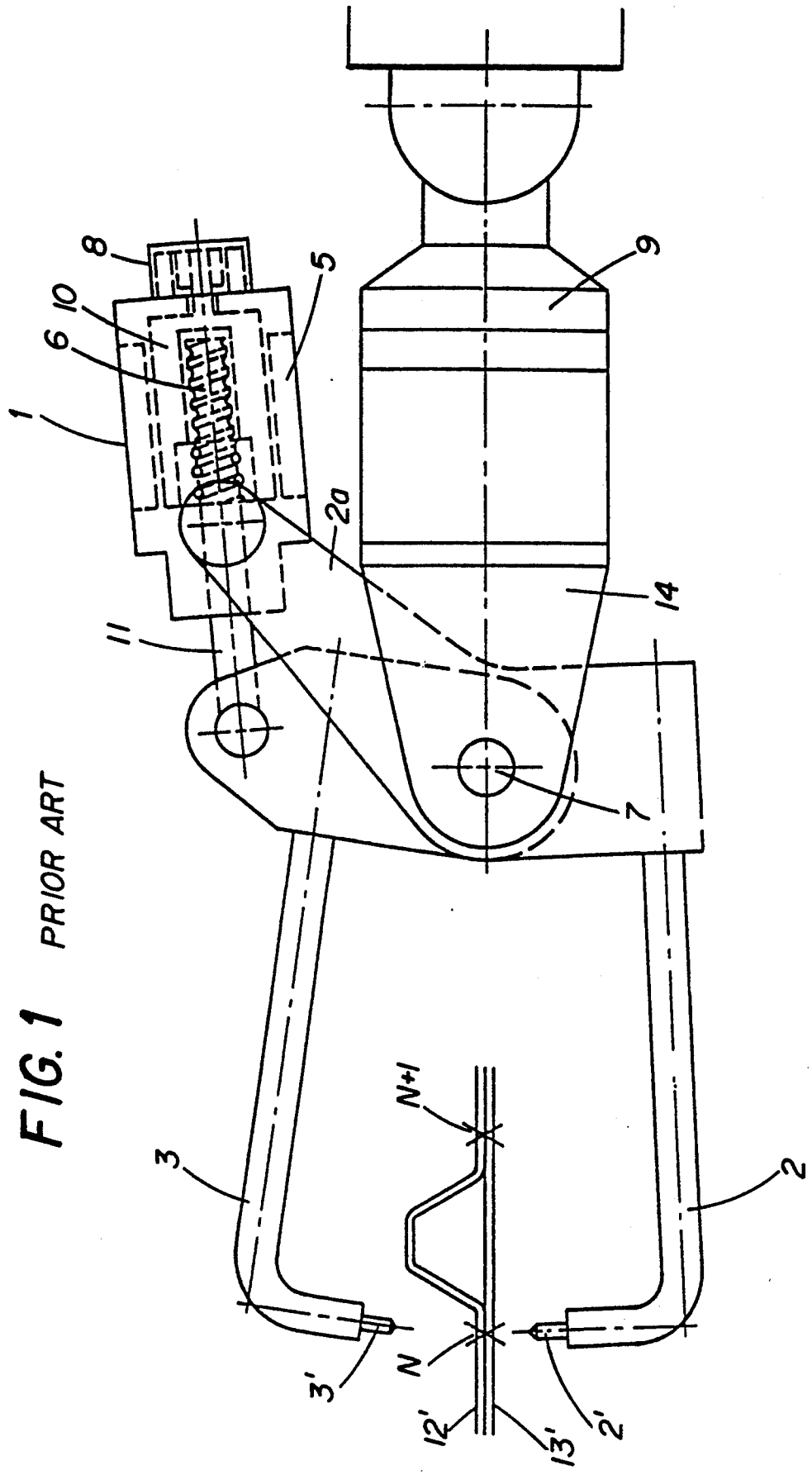
FIG. 1 is a diagrammatic side view of a known spot welding clamp fitted with a screw electrical actuator.
Figure 2A:
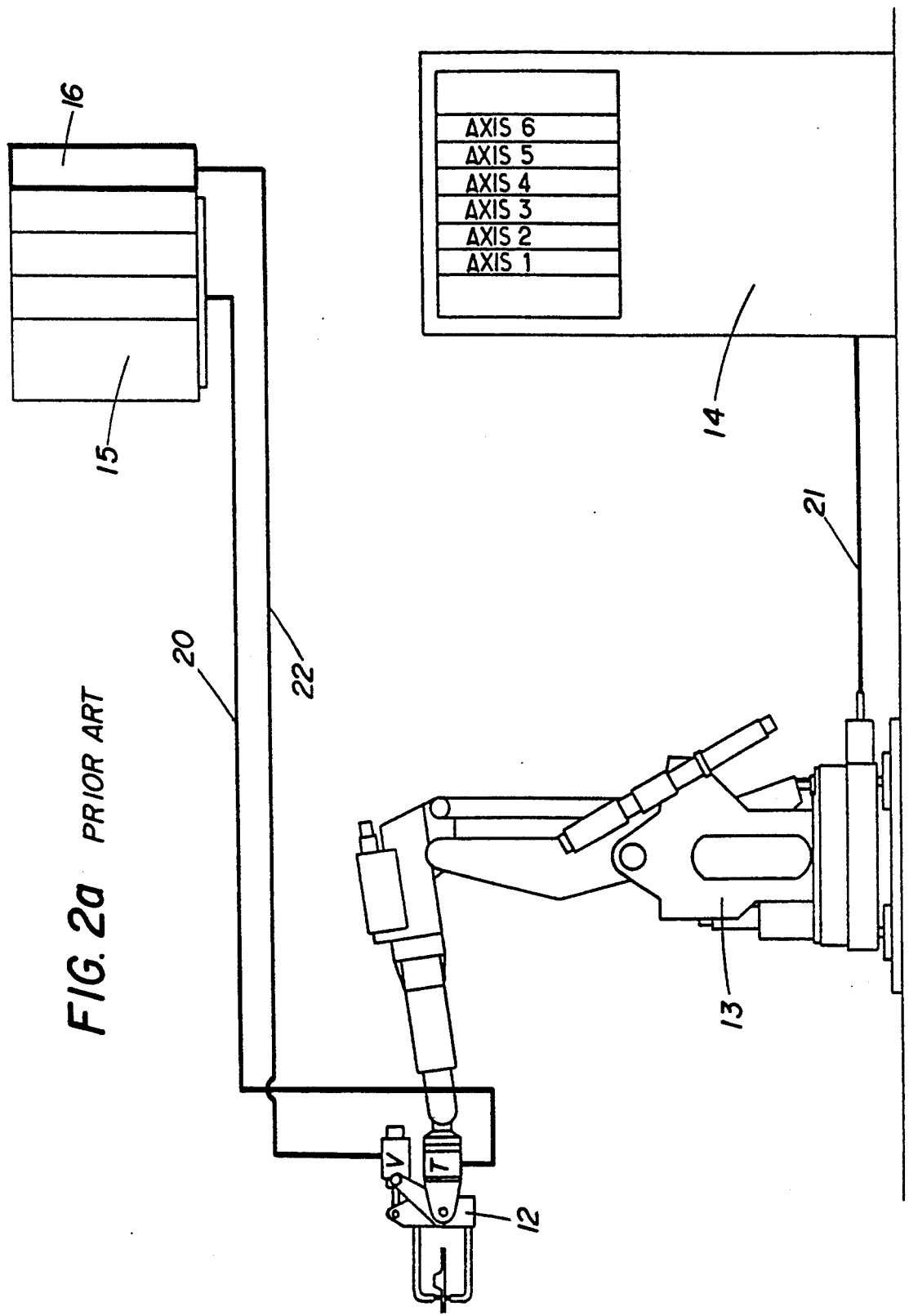
FIG. 2a shows a first known way of connecting the clamp, the automatic positioning system (robot) and the control units, respectively, for welding and for positioning.

FIG. 4 uses overall the same references as FIGS. 2a and 2b for designating the same portions of the installation or portions that have the same functions. The sensor referenced 18 may be constituted, for example, by a resolver providing data concerning the progress of the operation concerned, in this case a welding operation, and in particular the relative position of the electrodes. As in FIGS. 2a and 2b, the workpieces 12' and 13' that are to be assembled together are stationary relative to the ground while the clamp 12 is mounted on the wrist of a robot 13 which is assumed to be a six-axis robot.

As in FIGS. 2a and 2b, a bundle of cables 20 connects the transformer T of the clamp 12 to a cabinet 15 constituting that which may be called in more general terms "the operation control unit". The robot 13, or in more general terms "the positioning system" is still connected to its control unit 14 by a bundle of cables 21. As in FIG. 2b, the unit 14 includes an analogous servo-control unit 16, while the control unit 15 includes an additional servo-control unit 16' analogous to that in the configuration of FIG. 2a and connected to the electrical actuator V for controlling the opening and closing of the clamp via a cable 22 (the corresponding connections are similarly referenced 22 in FIGS. 2a and 2b).

With combined control, the servo-control unit 16' includes switching for switching between VREF ROBOT and VREF WELD, etc. Similarly, if combined control is not provided, the unit 16 must be capable of controlling the displacement and the forces specific to the application.

The data VPOS supplied by the sensor 18 of the actuator V is transmitted by the link 23 both to the servo-control unit 16 and to the additional servo-control unit 16'. The electronic switch 17 is designed so that the electrical actuator V can be controlled either by the servo-control unit 16 or by the servo-control unit 16' (it should be observed that the electrical actuator could be replaced by a servo-controlled hydropneumatic, or hydraulic, or pneumatic actuator).

Figure 5:
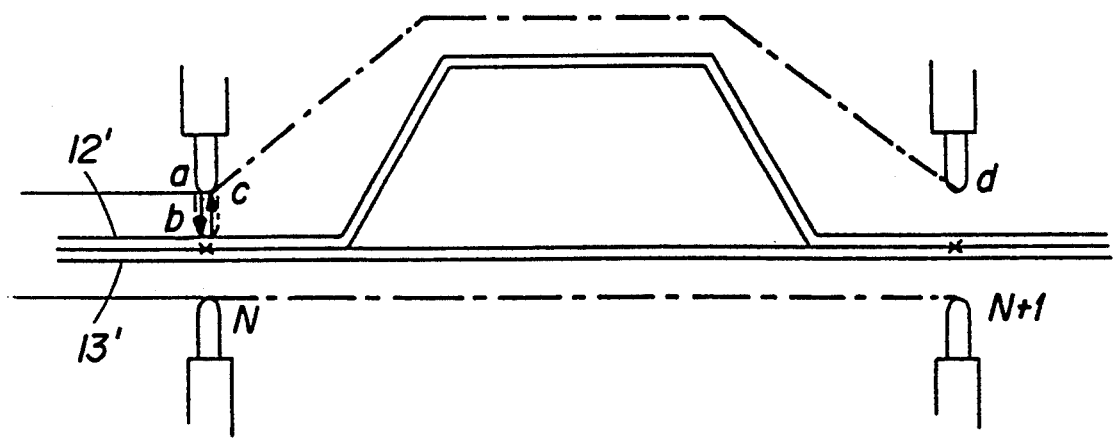
FIG. 5 shows the trajectory of the welding electrodes.
Figure 6A:
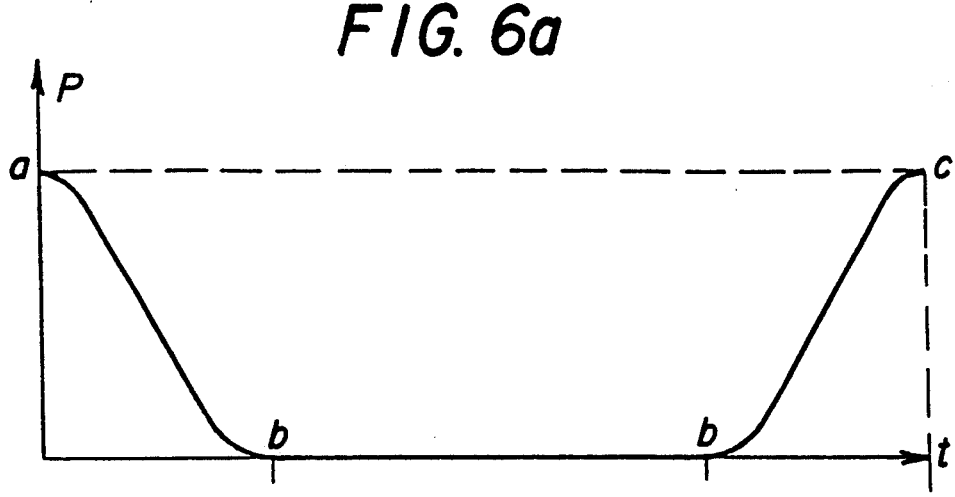
FIG. 6a is a graph showing how the position P of the electrodes varies, as a function of time during a welding cycle.
Figure 6B:
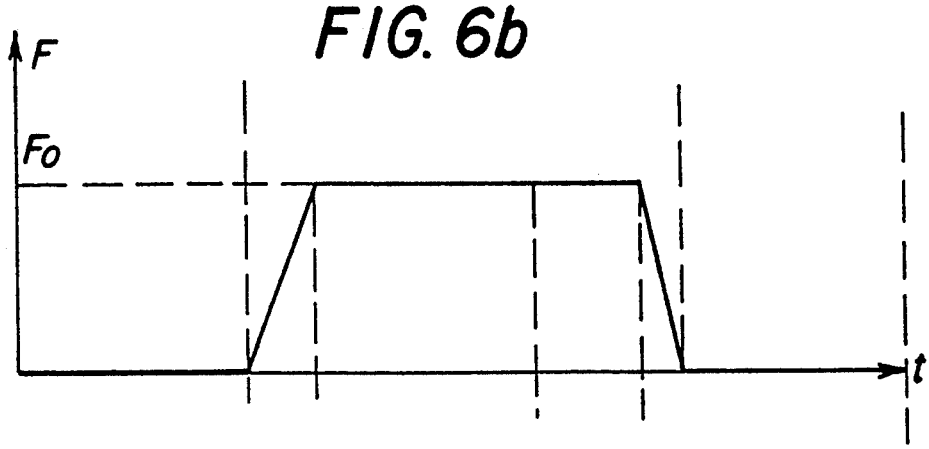
FIG. 6b shows the force F between the electrodes as a function of time, where Fo represents the welding force.

Under such circumstances, the installation may operate as follows: during a welding sequence, the clamp 12 is completely under the control of the welding cabinet 15. The full cycle comprises (FIG. 6): closure of the clamp (trajectory a-b, FIG. 5), application of pressure between the electrodes 2' and 3' with associated monitoring, application of welding current I, holding the clamp closed, return of the clamp to a small separation (trajectory b-c, FIG. 5) that is just large enough to detach the two electrodes 2' and 3' from the sheets 12' and 13' to be welded together. The "small separation" position may be programmed by the user.

At this moment, the welding control system delivers an "end of cycle" signal to the robot 13 and causes the electronic switch 17 to switch over to the control signal VREF ROBOT from the robot 13. At this moment, the robot cabinet 14 takes charge of controlling the motor V of the clamp 12 so as to synchronize the opening and the closing of the clamp with the movements of the robot on its way to spot N+1 (trajectory c-d, FIG. 5). This makes it possible to obtain a trajectory that is optimized with the time required for opening and closing the clamp being masked by the time required for displacing the robot. When spot N+1 is reached, with the clamp 12 again in its "small separation" position, the robot 13 ceases to move and delivers a START signal to the welding cabinet 15. The welding cabinet switches the electronic switch 17 over to the signal VREF WELD that comes from the cabinet itself. From this instant, the clamp 12 is controlled by the welding cabinet 15 and a new welding sequence may begin.

Figure 6C:
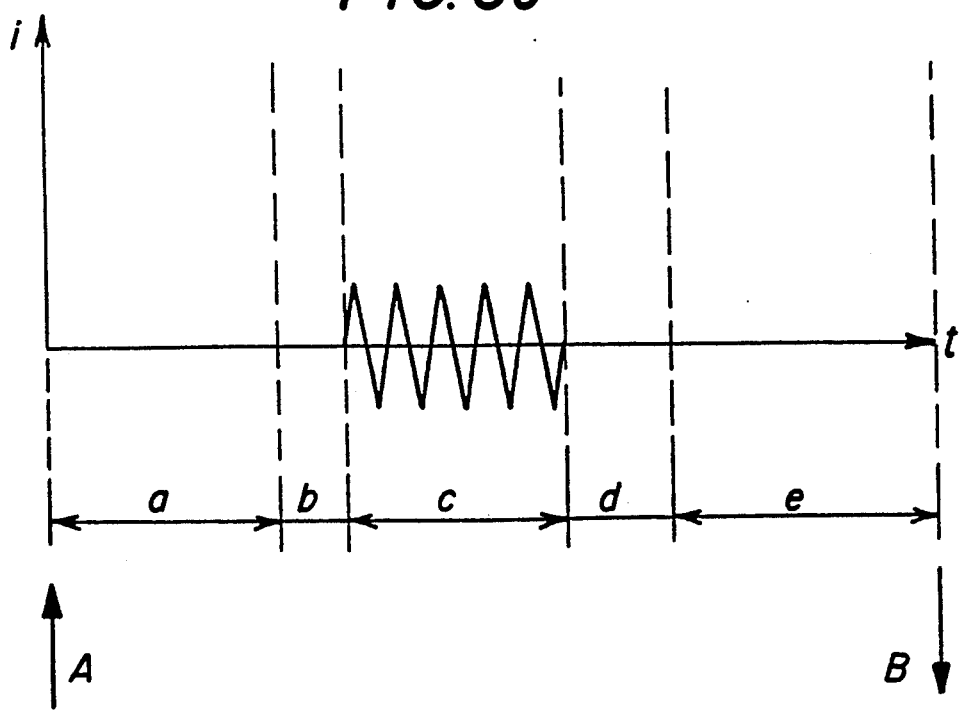
FIG. 6c shows how the welding current I varies as a function of time.

In FIG. 6c, the above-mentioned START command is located at A, and the end of the cycle is located at B, which corresponds to servo-control being switched from the welding cabinet 15 to the robot control cabinet 14. Stage a corresponds to the clamp 12 being closed, stage b corresponds to pressure being applied to the electrodes, stage c corresponds to the time during which welding current flows, stage d corresponds to pressure being maintained, and stage e corresponds to the electrodes being opened.

It is also be possible for switchover between VREF WELD and VREF ROBOT to be obtained automatically as soon as the clamp has opened more than or less than a preprogrammed value referred to as the "small separation". This will have the advantage of further reducing the cycle time.

It should also be observed that the switch 17 could form a part of the servo-control unit 16 instead of forming a part of the additional servo-control unit 16'. The switch could be electronic, electromechanical, optical, or of some other type.

I claim:

1. An installation for controlling tooling comprising:
   an automatic positioning system;
   a clamp for performing a particular operation on workpieces, relative displacements between said clamp and workpieces, relative displacements between said clamp and workpieces being controlled by said automatic positioning system;
   drive means for opening and closing and clamp;
   a first unit for controlling the operation;
   a second unit for controlling said automatic positioning system;
   a first servo-control unit suitable for controlling opening and closing of said clamp during the operation via said drive means;
   a second servo-control unit suitable for controlling opening and closing said clamp during a displacement stage via said drive means, said first and second servo-control units being integrated in the first and second units, respectively;
   a sensor for providing information relating to progress of the operation; and
   a switch controlled by said sensor, ensuring that during the operation, said drive means being controlled by said first servo-control unit and during the displacement stage, said drive means being controlled by said second servo-control unit.

2. An installation according to claim 1, wherein said switch forms a portion of second servo-control unit.

3. An installation according to claim 1, wherein said switch forms a portion of said first servo-control unit.

4. An installation according to claim 1 wherein the clamp further comprises two welding electrodes for performing a welding operation on workpieces.

5. An installation according to claim 1, wherein said operation to be performed on the workpieces is a crimping, stamping, or stapling operation.

6. An installation according to claim 1, wherein said drive means comprise an electric screw actuator.

7. Any installation according to claim 1, wherein said drive means comprise a servo-control hydropneumataic, or hydraulic, or pneumatic actuator.

8. An installation according to claim 1, wherein said second said unit for controlling said positioning system comprises a cabinet for controlling a robot.

9. An installation according to claim 1, wherein second said unit for controlling said positioning system comprises a numerical control system, a programmable controller, or a computer.

10. An installation according to claim 1, wherein said switch is an electronic switch, an electromechanical switch, or an optical switch.

* * * * *